United States Patent
Su

(10) Patent No.: US 10,545,876 B2
(45) Date of Patent: Jan. 28, 2020

(54) CONTROL UNIT FOR DATA STORAGE SYSTEM AND METHOD FOR UPDATING LOGICAL-TO-PHYSICAL MAPPING TABLE

(71) Applicant: Silicon Motion, Inc., Jhubei, Hsinchu County (TW)

(72) Inventor: Che-Jen Su, Zhubei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 0 days.

(21) Appl. No.: 16/180,251

(22) Filed: Nov. 5, 2018

(65) Prior Publication Data

US 2019/0303299 A1   Oct. 3, 2019

(30) Foreign Application Priority Data

Mar. 31, 2018 (TW) .............................. 107111496 A

(51) Int. Cl.
*G06F 12/00* (2006.01)
*G06F 12/1009* (2016.01)

(52) U.S. Cl.
CPC .. *G06F 12/1009* (2013.01); *G06F 2212/1044* (2013.01); *G06F 2212/657* (2013.01)

(58) Field of Classification Search
CPC ................. G06F 12/10; G06F 12/1009; G06F 2212/1044; G06F 12/657
See application file for complete search history.

(56) References Cited

U.S. PATENT DOCUMENTS

| | | |
|---|---|---|
| 2009/0198952 A1 | 8/2009 | Khmelnitsky et al. |
| 2010/0030999 A1 | 2/2010 | Hinz |
| 2011/0072194 A1 | 3/2011 | Forhan et al. |
| 2014/0052898 A1 | 2/2014 | Nan |
| 2014/0101369 A1 | 4/2014 | Tomlin et al. |
| 2014/0337560 A1 | 11/2014 | Chun et al. |
| 2014/0379968 A1* | 12/2014 | Yao ..................... G06F 12/0246 711/103 |
| 2015/0186225 A1 | 7/2015 | Lin et al. |

(Continued)

FOREIGN PATENT DOCUMENTS

| | | |
|---|---|---|
| CN | 105027090 A | 11/2015 |
| TW | 201525691 A | 7/2015 |
| TW | 201527970 A | 7/2015 |

*Primary Examiner* — Shawn X Gu
(74) *Attorney, Agent, or Firm* — McClure, Qualey & Rodack, LLP

(57) ABSTRACT

A control unit for a data storage system is shown, which provides at least two buffers for updating mapping information through a host memory buffer HMB. A first buffer is provided for dynamic management of a physical-to-logical mapping table F2H that records a mapping relationship which maps a physical address within a target block to a logical address of a sector of user data stored at the physical address. The control unit performs reverse conversion on the mapping relationship to get reversed mapping information for the logical address and, accordingly, selects a target logical-to-physical mapping sub-table. A second buffer is provided to buffer the target logical-to-physical mapping sub-table when the target logical-to-physical mapping sub-table is read from the host memory buffer HMB. The control unit updates the target logical-to-physical mapping sub-table on the second buffer based on the reversed mapping information about the logical address.

20 Claims, 7 Drawing Sheets

(56) References Cited

U.S. PATENT DOCUMENTS

2015/0186261 A1     7/2015   Lin et al.
2017/0255388 A1*   9/2017   Sharma ................ G06F 3/0605
2018/0349266 A1*   12/2018   Canepa ............... G06F 12/0246

* cited by examiner

CONTROL UNIT FOR DATA STORAGE SYSTEM AND METHOD FOR UPDATING LOGICAL-TO-PHYSICAL MAPPING TABLE

CROSS REFERENCE TO RELATED APPLICATIONS

This Application claims priority of Taiwan Patent Application No. 107111496, filed on Mar. 31, 2018, the entirety of which is incorporated by reference herein.

BACKGROUND OF THE INVENTION

Field of the Invention

The present invention relates to data storage devices and methods for operating non-volatile memory.

Description of the Related Art

There are various forms of non-volatile memory (NVM) for long-term data retention, such as flash memory, magnetoresistive RAM, ferroelectric RAM, resistive RAM, spin transfer torque-RAM (STT-RAM), and so on.

How to operate a non-volatile memory to achieve high data reliability with high efficiency and at a low cost is an important issue in the technical field.

BRIEF SUMMARY OF THE INVENTION

A non-volatile memory control technology with a host memory buffer (HMB) is disclosed in the present invention.

In an exemplary embodiment, a control unit for a data storage system is shown. The control unit provides at least two buffers for updating mapping information through a host memory buffer HMB. A first buffer is provided for dynamic management of a physical-to-logical mapping table F2H that records a mapping relationship which maps a physical address within a target block to a logical address of a sector of user data stored at the physical address. The control unit performs reverse conversion on the mapping relationship to get reversed mapping information for the logical address and, accordingly, selects a target logical-to-physical mapping sub-table. A second buffer is provided to buffer the target logical-to-physical mapping sub-table when the target logical-to-physical mapping sub-table is read from a host memory buffer HMB. The control unit updates the target logical-to-physical mapping sub-table on the second buffer based on the reversed mapping information about the logical address.

In another exemplary embodiment, a method for updating a logical-to-physical mapping table H2F of a non-volatile memory comprises the following steps: managing a physical-to-logical mapping table F2H, wherein the physical-to-logical mapping table F2H records a mapping relationship which maps a physical address within a target block to a logical address of a sector of user data stored at the physical address; performing reverse conversion on the mapping relationship to get reversed mapping information for the logical address, and selecting a target logical-to-physical mapping sub-table according to the logical address; and fetching the target logical-to-physical mapping sub-table from a host memory buffer HMB, and updating the target logical-to-physical mapping sub-table fetched from the host memory buffer HMB based on the reversed mapping information about the logical address.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
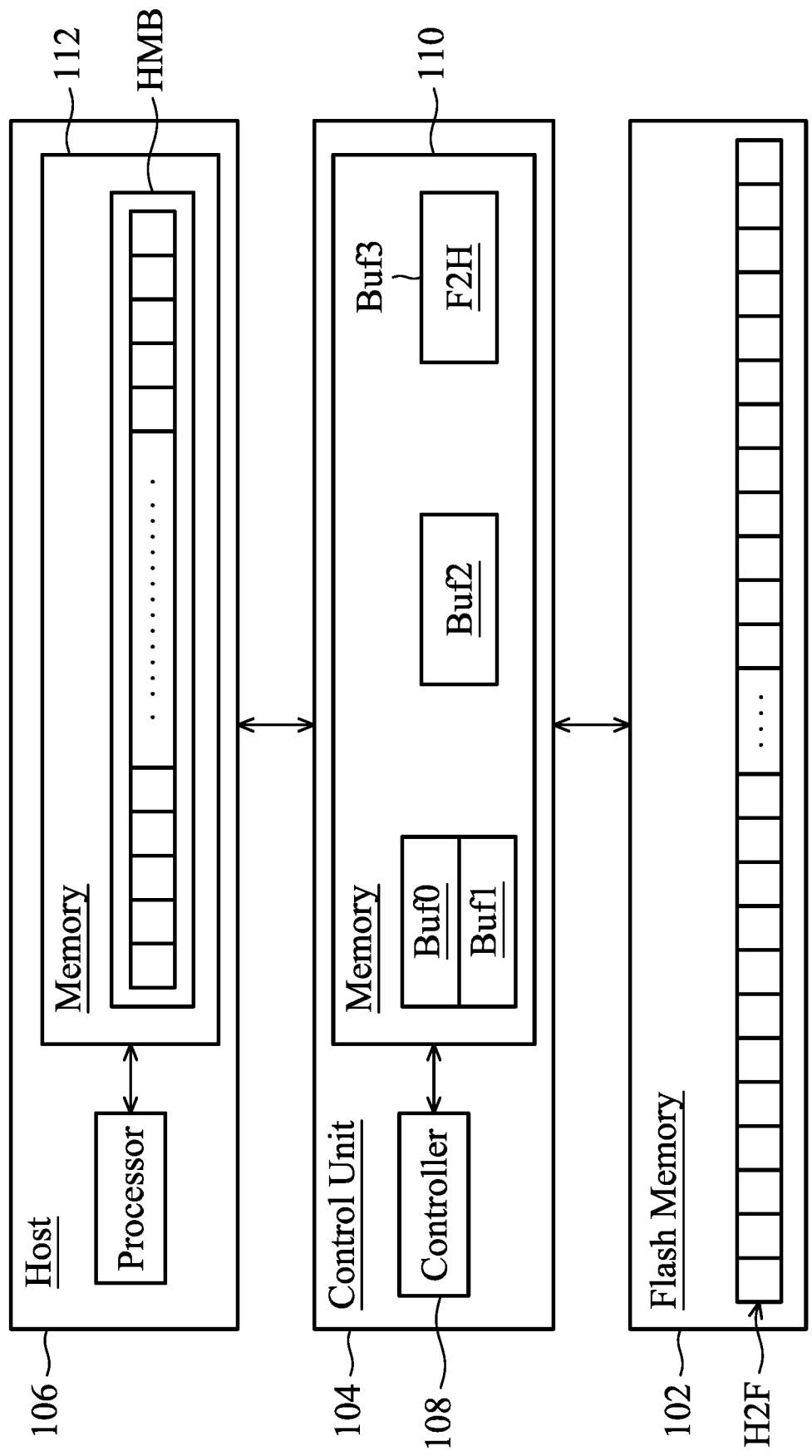
FIG. 1 illustrates a data storage system in accordance with an embodiment of the present invention, wherein in addition to using a data storage device including a flash memory 102 and a control unit 104, the data storage system involves a host memory buffer HMB provided on a host 106.

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive RAM, a ferroelectric RAM, a resistive RAM, a spin transfer torque-RAM (STT-RAM) and so on. A non-volatile memory may be used to implement a data storage device or a data center. The following discussion uses flash memory as an example.

Flash memory is often used as a storage medium in today's data storage devices. Flash memory is often implemented in memory cards, USB flash devices, SSDs, and so on. In another exemplary embodiment, a flash memory may be packaged with a controller to form a multiple-chip package named eMMC.

A data storage device using a flash memory as a storage medium can be applied in a variety of electronic devices, including a smartphone, a wearable device, a tablet computer, a virtual reality device, etc. A calculation module of an electronic device may be regarded as a host that operates a data storage device equipped on the electronic device to access a flash memory within the data storage device.

A data center may be built with flash memories as the storage medium. For example, a server may operate an array of SSDs to form a data center. The server may be regarded as a host that operates the SSDs to access the flash memories within the SSDs.

The host distinguishes the flash memory storage contents by logical addresses (for example, according to a logical block address LBA, a global host page number GHP, a host block number HBlk, or a host page number HPage, etc.). After writing user data to the flash memory, the mapping relationship between the logical address of the user data and the physical space storing the user data is recorded by a control unit of the flash memory. When the host requests to read the user data, the control unit accesses the flash memory for the requested user data according to the recorded mapping relationship.

For a data storage device with a flash memory as the storage medium, the storage space is divided into blocks with each block including pages. An erasure operation is performed in block units. A dirty block may be erased as a spare block to receive new data and then being regarded as a new data block. When pages of user data are written to one block, the logical addresses of the pages of user data have to be recorded to form a physical-to-logical mapping table F2H for the block. A spare block selected to receive write data is named an active block. A spare block selected as a destination for user data collected from a source block due to garbage collection is named a destination block. A physical-to-logical mapping table F2H of an active block or a destination block may be dynamically updated on a volatile memory (e.g. dynamically managed on an SRAM of a control unit/controller of a data storage device), and then being converted (by a reverse conversion) to update a logical-to-physical mapping table H2F. The control unit refreshes the entire logical-to-physical mapping table H2F on the flash memory or only refreshes the updated part of the logical-to-physical mapping table (H2F) on the flash memory. The physical-to-logical mapping table F2H dynamically updated on the volatile memory according to the update of the active/destination block is generally referred to as a small table. The logical-to-physical mapping table stored in the flash memory (H2F) for non-volatile storage is generally referred to as a big table. By operating the control unit, the mapping information recorded in the small table F2H is sealed into the large table H2F in one attempt or over several attempts. The control unit accesses the flash memory for user data based on the large table H2F. A data storage system with a host memory buffering architecture is disclosed in the present invention, wherein the mapping information recorded in the small table F2H is sealed into the large table H2F with high accuracy and in real time.

FIG. 1 illustrates a data storage system in accordance with an embodiment of the present invention. In addition to using a data storage device including a flash memory 102 and a control unit 104, the data storage system involves a host memory buffer HMB provided on a host 106. A data storage device including the flash memory 102 and the control unit 104 without including the host 106, or a data storage architecture including the flash memory 102, the control unit 104 and the host 106 as shown both are considered within the scope of the present invention.

The flash memory 102 is controlled by the control unit 104 in response to access requests issued by the host 106. The control unit 104 includes a controller 108 and a memory 110 (i.e., a device-side memory). The memory 110 may be integrated into an IC package with the controller 108. In another exemplary embodiment, the memory 110 and the controller 108 are separately packaged. The memory 110 may be a static random access memory (SRAM) or a dynamic random access memory (DRAM). In order to operate the flash memory 102 efficiently, the controller 108 not only uses the memory 110 but also utilizes the host memory buffer HMB allocated in a memory 112 of the host 106. The memory 112 may be a system memory of the host 106 (such as a dynamic random access memory DRAM for system operations). Because of the large space of a system memory, it is workable to allocate a part of the system memory to the controller 108 of the data storage device to share the workload of the memory 110. In the host memory buffer (HMB) architecture, the memory 110 of the data storage device does not need a large capacity. Thus, the manufacture cost of the data storage device is significantly reduced. Preferably, the control unit 104 and the host 106 communicate through PCIE, SATA, or a communication protocol, such as an NVMe communication protocol, supporting a host memory buffer (HMB) architecture.

The host 106 indicates a host block HBlk and a host page HPage (which form a logical address) of the write data, and the data storage device assigns a physical address and stores the write data at the physical address. In addition to the non-volatile storage of the write data, the flash memory 102 further stores logical-to-physical mapping sub-tables H2F_Tabs which form the logical-to-physical mapping table H2F. In an exemplary embodiment, the storage capacity of the data storage device is 256 GB and the size of each host block HBlk is 64 MB, the data storage device can store data of 4K host blocks HBlks. When each host page HPage corresponds to 4 KB of user data, each host block HBlk has 16K host pages HPages. The mapping information that maps one logical address to one physical address is 4 B. Considering the different logical addresses, the logical-to-physical mapping table H2F of the data storage device is established and is 256 MB. According to the logical-to-physical mapping table H2F, logical addresses map to physical addresses. The logical-to-physical mapping table H2F may be divided into 4K sub-tables H2F_Tabs. Each logical-to-physical mapping sub-table H2F_Tab is 64 KB in size, with 16K records of logical-to-physical mapping information. The control unit 104 may select a (target) logical-to-physical mapping sub-table H2F_Tab according to the host block HBlk and host page HPage. The control unit 104 reads out the selected logical-to-physical mapping sub-table H2F_Tab from the flash memory 102 to get the requested mapping information. When any record in the logical-to-physical mapping sub-table H2F_Tab is updated, the control unit 104 stores the updated logical-to-physical mapping sub-table H2F_Tab back in the flash memory 102. In an exemplary embodiment, according to the number labeling the requested host block HBlk, the corresponding logical-to-physical mapping sub-table (H2F_Tab) labeled by the same number is obtained. According to the number labeling the requested host page HPage, the logical-to-physical mapping sub-table (H2F_Tab) provides the corresponding record labeled by the same number. The access to the records within the logical-to-physical mapping sub-table (H2F_Tab) is simplified.

FIG. 1 shows how the control unit 104 uses the memory 110, including planning buffers Buf0, Buf1, Buf2, and Buf3 on the memory 110. The buffer Buf3 is planned for dynamic management of a physical-to-logical mapping table F2H of an active block or a destination block. Mapping information showing the logical addresses of data stored at the different physical addresses of the active/destination block is recorded in the physical-to-logical mapping table F2H. The buffer Buf3 buffers the physical-to-logical mapping table F2H. The physical-to-logical mapping table F2H buffered in the buffer Buf3 may correspond to the complete active/destination block or just a part of the active/destination block.

The control unit 104 performs reverse conversion on the records buffered in the buffer Buf3 one-by-one to get reversed mapping information that maps logical addresses to physical addresses and, accordingly, to update the logicalto-physical mapping table H2F. More precisely, the update is made on one or more logical-to-physical mapping sub-tables H2F_Tabs.

Figure 2:
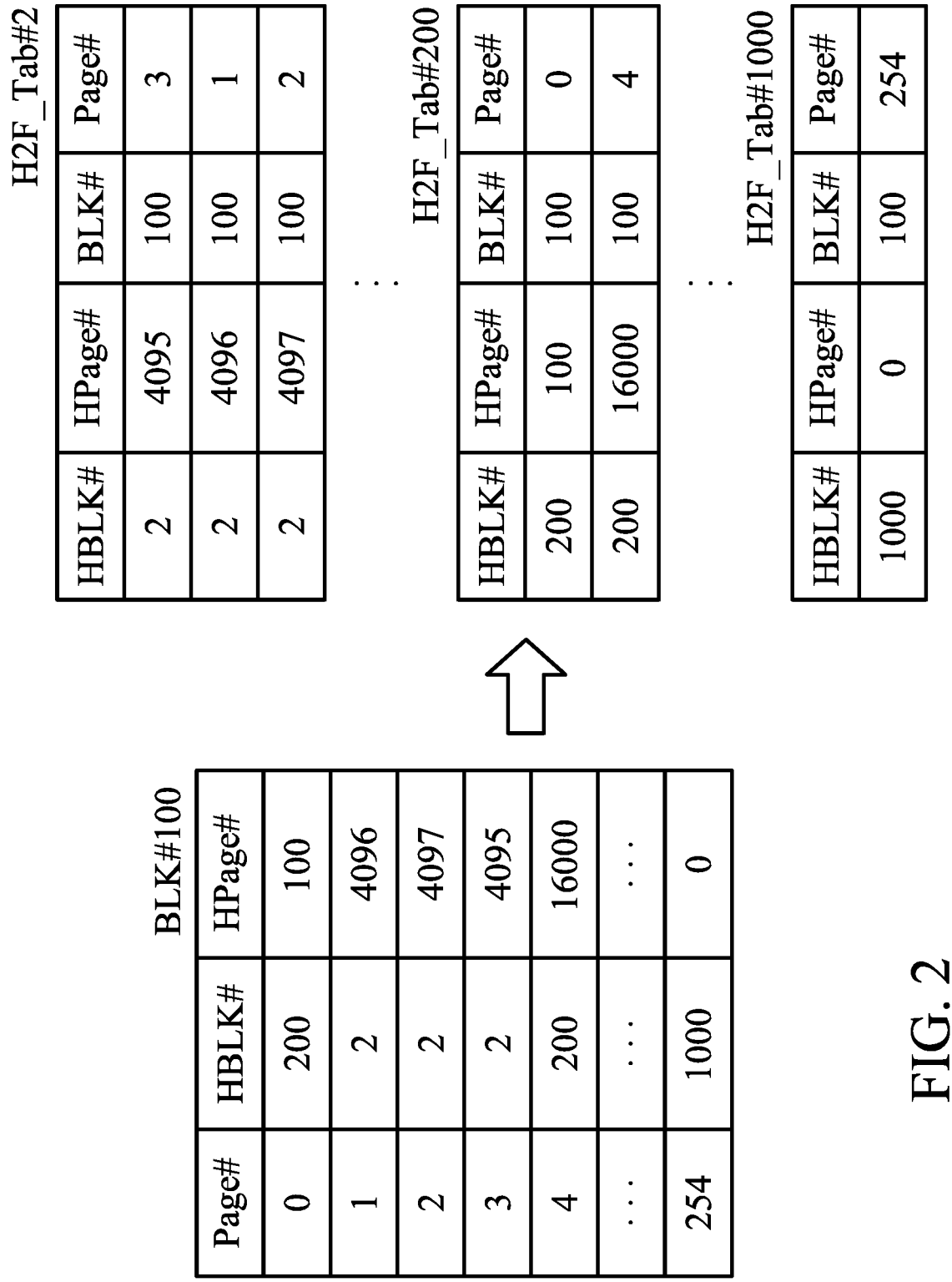
FIG. 2 illustrates an example of the reordering procedure.

In an exemplary embodiment, the control unit 104 performs a reordering procedure on the physical-to-logical mapping table F2H to get the reversed mapping information. FIG. 2 illustrates an example of the reordering procedure. The control unit 104 selects block BLK#100 as an active block and writes pages of user data to the active block BLK#100. Page #0 stores data of a host page HPage#100 of a host block HBlk#200, page #1 stores data of a host page HPage#4096 of a host block HBlk#2, page #2 stores data of a host page HPage#4097 of a host block HBlk#2 . . . . The physical addresees are mapped to the logical addresses and a physical-to-logical mapping table is established (e.g., F2H established in Buf3 of FIG. 1). In an exemplary embodiment, the mapping information of each page of the active block BLK#100 is read to establish a physical-to-logical mapping table F2H. The control unit 104 reorders the mapping information of the physical-to-logical mapping table F2H according to host block numbers HBlk#. Reversed mapping information corresponding to each host block number HBlk# is collected. For example, the reversed mapping information related to host blocks HBlk#2, #200, and #1000 are obtained from the physical-to-logical mapping table F2H and used in the update of the logical-to-physical mapping sub-tables H2F_Tab#2, #200, and #1000 of the host blocks HBlk#2, #200, and #1000.

In an exemplary embodiment, the physical-to-logical mapping table F2H is scanned from the ending page to the beginning page during the reordering procedure. The latest mapping information is scanned first and the old mapping information is skipped or omitted. In another exemplary embodiment, the physical-to-logical mapping table F2H is scanned from the beginning page to the ending page during the reordering procedure. The mapping information scanned later replaces the mapping information scanned earlier. The reversed mapping information obtained from the physical-to-logical mapping table F2H is preferably rearranged according to the host block number HBlk# (or further rearranged in an order considering the host page number HPage#).

In an exemplary embodiment, the reordering procedure may be implemented using dedicated hardware. For example, the controller 108 may include reordering hardware to speed up the reordering procedure.

According to a requested host block number, a logical-to-physical mapping sub-table H2F_Tab is selected to be updated. The buffers Buf0 and Buf1 (preferably operated in a ping-pong mode) are provided to buffer logical-to-physical mapping sub-tables H2F_Tabs fetched from the flash memory 102 and upload the buffered logical-to-physical mapping sub-tables H2F_Tabs to the host memory buffer (HMB) of the memory 112. The ping-pong mode operations of the buffers Buf0 and Buf1 are discussed in the following paragraph. When one logical-to-physical mapping sub-table H2F_Tab is fetched from the flash memory 102 to be buffered in one of the buffers Buf0 and Buf1, another logical-to-physical mapping sub-table H2F_Tab already buffered in another one of the buffers Buf0 and Buf1 is uploaded to the host memory buffer HMB. The fetching and uploading of logical-to-physical mapping sub-tables H2F_Tabs are sped up. In an exemplary embodiment, up to 256 logical-to-physical mapping sub-tables H2F_Tabs can be buffered in the host memory buffer HMB. The design of the host memory buffer HMB also helps the acceleration of the access of the logical-to-physical mapping sub-tables H2F_Tabs. In an exemplary embodiment, logical-to-physical mapping sub-tables H2F_Tabs with consecutive numbers are selected and pre-loaded to the host memory buffer HMB.

A logical-to-physical mapping sub-table H2F_Tab uploaded to the host memory buffer HMB will be read by the control unit 104 again upon being selected as a target logical-to-physical mapping sub-table. The control unit 104 reads the target logical-to-physical mapping sub-table H2F_Tab from the host memory buffer HMB to be buffered and modified in the buffer Buf2. The control unit 104 updates the target logical-to-physical mapping sub-table H2F_Tab based on the reversed mapping information obtained from the physical-to-logical mapping table F2H. Then, the control unit 104 stores the target logical-to-physical mapping sub-table H2F_Tab that has been modified on the buffer Buf2 back in the host memory buffer HMB.

As for the logical-to-physical mapping sub-tables H2F_Tabs which have been modified and stored back in the host memory buffer HMB, the control unit 104 may further store them back in the flash memory 102 for non-volatile storage through the buffers Buf0 and Buf1 in one attempt (or in separated intervals) by operating the buffers Buf0 and Buf1 in a ping-pong mode.

In an exemplary embodiment, when updating the logical-to-physical mapping sub-tables H2F_Tab#2, #200, and #1000 using the reversed mapping information obtained from the physical-to-logical mapping table F2H, it is preferable to use the buffer Buf2 to buffer only what needs to be updated. For example, when updating the logical-to-physical mapping sub-table H2F_Tab#2, it is preferable to buffer only the records of host pages #4095 to 4097 of the logical-to-physical mapping sub-table H2F_Tab#2 to the buffer Buf2 rather than having the entire logical-to-physical mapping sub-table H2F_Tab#2 buffered in the buffer Buf2. In this way, the size of the buffer Buf2 can be small, and the downloading and uploading speed of the logical-to-physical mapping sub-table H2F_Tab#2 can be accelerated.

The control unit 104 accesses the host memory buffer HMB through a high-speed transmission interface to get the pre-fetched logical-to-physical mapping sub-tables H2F_Tabs for modification. Compared to accessing the flash memory 102 for the logical-to-physical mapping sub-tables H2F_Tabs through the low-speed ONFI or Toggle transmission interface, the high-speed interface provides higher efficiency. The updated logical-to-physical mapping sub-tables H2F_Tabs normally are cached in the host memory buffer HMB instead of being immediately stored back in the flash memory 102. The number of accesses of the flash memory 102 can be reduced. The life of the flash memory 102 is thus effectively extended, solving the lack of conventional skills.

In an exemplary embodiment, the control unit 104 reads the logical-to-physical mapping sub-tables H2F_Tabs from the flash memory 102 to the host memory buffer HMB according to the priorities assigned to the sub-tables H2F_Tabs. For example, the logical-to-physical mapping sub-table H2F_Tab with a higher priority or the highest priority is read from the flash memory 102 to the host memory buffer HMB earlier than the other sub-tables H2F_Tabs. In some exemplary embodiments, the updated ones or all of the logical-to-physical mapping sub-tables H2F_Tabs buffered in the host memory buffer HMB are stored back in the flash memory 102 according to the assigned priority (e.g. the sub-table H2F_Tab with the highest priority is stored back in the flash memory 102 earlier than the other sub-tables H2F_Tabs).

Figure 3A:
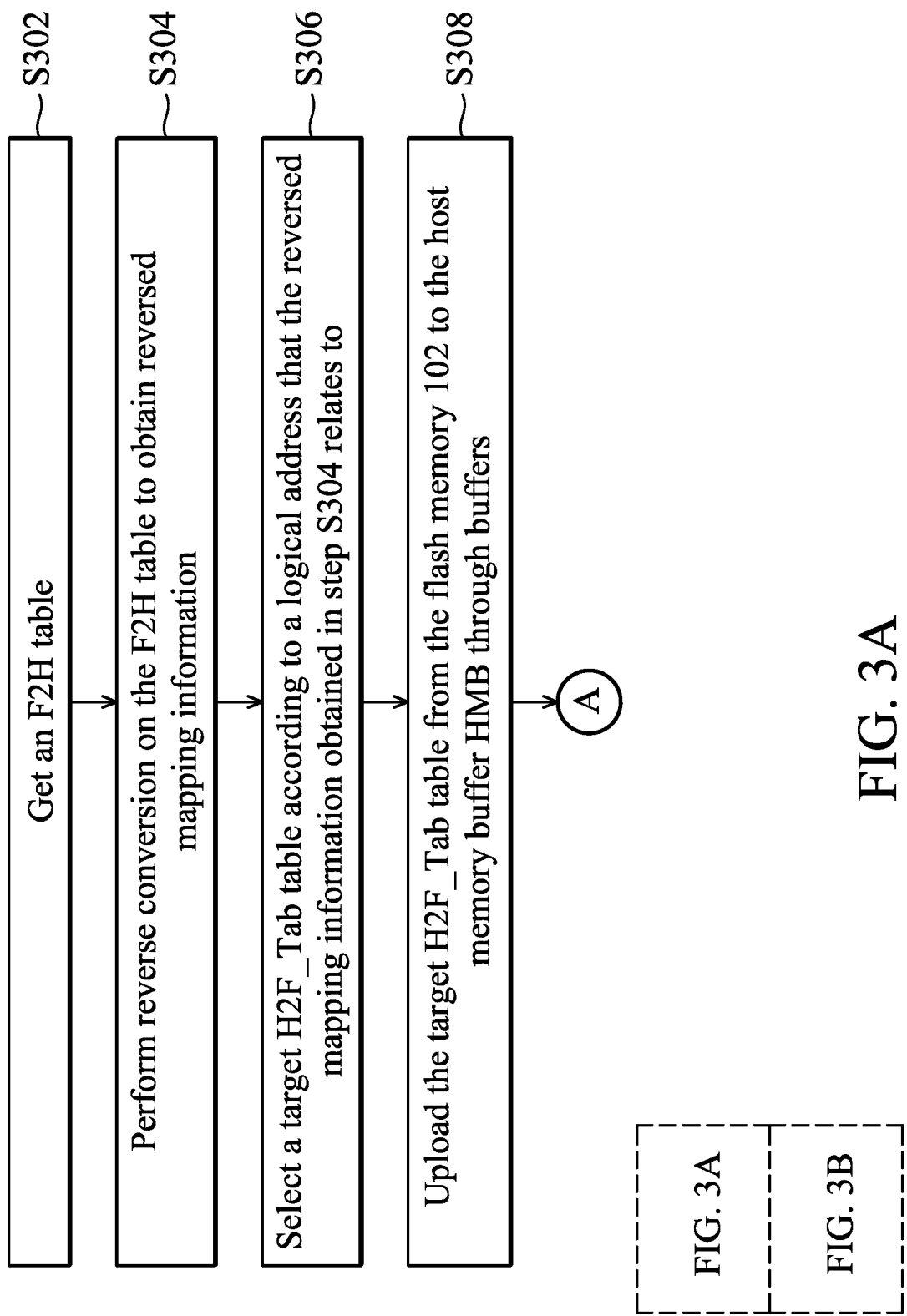
FIG. 3A and FIG. 3B show a flowchart depicting the detailed steps of updating a logical-to-physical mapping table (H2F) in a host memory buffer (HMB) architecture.
Figure 3B:
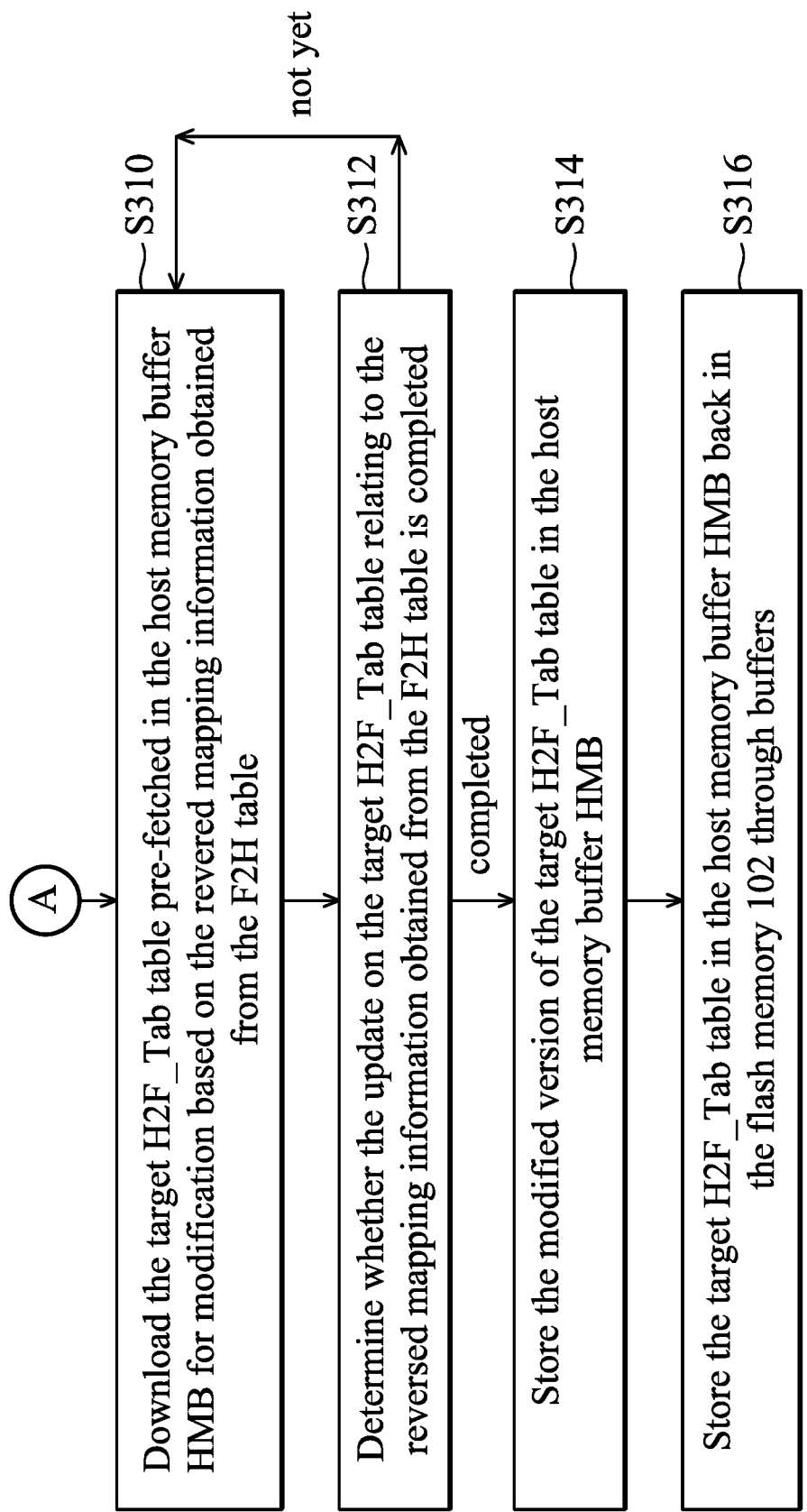

FIG. 3A and FIG. 3B a flowchart depicting the detailed steps of updating a logical-to-physical mapping table (H2F) in a host memory buffer (HMB) architecture. In step S302, the control unit 104 gets a physical-to-logical mapping table F2H of an active block or a destination block, which shows how physical addresses of the active/destination block map to the logical addresses of user data stored therein. The control unit 104 stores the whole or just a part of physical-to-logical mapping information of the active/destination block to the buffer Buf3 as the physical-to-logical mapping table F2H. Each time step S302 is performed, it may get just a part of the physical-to-logical mapping information of the active/destination block.

In step S304, reverse conversion is performed on the physical-to-logical mapping table F2H to obtain reversed mapping information. The control unit 104 performs reverse conversion on the physical-to-logical mapping table F2H that is buffered in the buffer Buf3 to obtain the reversed mapping information that maps logical addresses to physical addresses.

In step S306, a target logical-to-physical mapping sub-table H2F_Tab is selected by the control unit 104 according to a logical address that the reversed mapping information obtained in step S304 relates to. For example, the logical-to-physical mapping sub-tables H2F_Tab#2, #200, and #1000 take turns to be selected as the target logical-to-physical mapping sub-table H2F_Tab. The control unit 104 may select the target logical-to-physical mapping sub-table (H2F_Tab) in different time points according to the logical addresses that the reversed mapping information obtained in step S304 relates to.

In step S308, the target logical-to-physical mapping sub-table H2F_Tab is uploaded from the flash memory 102 to the host memory buffer HMB through the buffers provided in the control unit 104. For example, the control unit 104 may upload the logical-to-physical mapping sub-table H2F_Tab#2 from the flash memory 102 to the host memory buffer HMB through the buffer Buf0 or Buf1. To upload multiple logical-to-physical mapping sub-tables H2F_Tabs (e.g. including the logical-to-physical mapping sub-tables H2F_Tab#2, #200 and #1000) from the flash memory 102 to the host memory buffer HMB, the control unit 104 operates the buffers Buf0 and Buf1 in a ping-pong mode.

In step S310, the target logical-to-physical mapping sub-table H2F_Tab pre-fetched in the host memory buffer HMB is downloaded and modified based on the revered mapping information obtained from the physical-to-logical mapping table F2H. For example, the control unit 104 downloads the logical-to-physical mapping sub-table H2F_Tab#2 from the host memory buffer HMB to the buffer Buf2 to be modified based on the revered mapping information obtained from the physical-to-logical mapping table F2H. For example, the records (each indicates a physical address represented by a block number BLK# and a page number Page#) of host pages #4095 to 4097 of the logical-to-physical mapping sub-table H2F_Tab#2 are modified in the buffer Buf2.

In step S310, the control unit 104 may only partially download the target logical-to-physical mapping sub-table H2F_Tab from the host memory buffer HMB to the buffer Buf2. For example, instead of downloading the complete logical-to-physical mapping sub-table H2F_Tab#2 from the host memory buffer HMB to the buffer Buf2, the control unit 104 downloads only the records of the host pages #4095 to 4097 of the logical-to-physical mapping sub-table H2F_Tab#2 from the host memory buffer HMB to the buffer Buf2 to be modified based on the revered mapping information obtained from the physical-to-logical mapping table F2H.

In addition, since the target logical-to-physical mapping sub-table H2F_Tab is downloaded from the host memory buffer HMB and buffered and modified in the buffer Buf2, the control unit 104 can continue to operate the buffers Buf0 and Buf1 in the ping-pong mode to upload the other logical-to-physical mapping sub-tables H2F_Tabs from the flash memory 102 to the host memory buffer HMB. In another exemplary embodiment, there is no buffer Buf2. The control unit 104 downloads the target logical-to-physical mapping sub-table H2F_Tab#2 from the host memory buffer HMB to one of the buffers Buf0 and Buf1 (to be modified according to reversed mapping information obtained from the physical-to-logical mapping table F2H) and uses the other one of the of the buffers Buf0 and Buf1 to upload the other logical-to-physical mapping sub-tables H2F_Tabs to the host memory buffer HMB.

In step S312, it is determined whether the update on the target logical-to-physical mapping sub-table H2F_Tab relating to the reversed mapping information obtained from the physical-to-logical mapping table F2H is completed. If not, the update in step S310 is repeated again. The update on the target logical-to-physical mapping sub-table H2F_Tab #2 is not limited to only a single record. If there are three records in the logical-to-physical mapping sub-table H2F_Tab#2 that need to be updated, it is more efficient to update the three records in a series before performing the subsequent steps. However, step S312 is an optional step. In an exemplary embodiment, only one single record of the logical-to-physical mapping sub-table H2F_Tab#2 is updated by each execution of step S310 that is followed by step S314.

In step S314, the modified version of the target logical-to-physical mapping sub-table H2F_Tab is stored back in the host memory buffer HMB. For example, the control unit 104 uploads the modified version of the target logical-to-physical mapping sub-table H2F_Tab#2 from the buffer Buf2 to the host-side buffer HMB.

In step S316, the target logical-to-physical mapping sub-table H2F_Tab in the host memory buffer HMB is stored back in the flash memory 102 through the buffers of the control unit 104. For example, the control unit 104 operates the buffers Buf0 and Buf1 in the ping-pong mode to transfer the modified version of the target logical-to-physical mapping sub-table H2F_Tab#2 downloaded from the host memory buffer HMB to the flash memory 102 for non-volatile storage (preventing it from being lost due to power loss).

Figure 4:
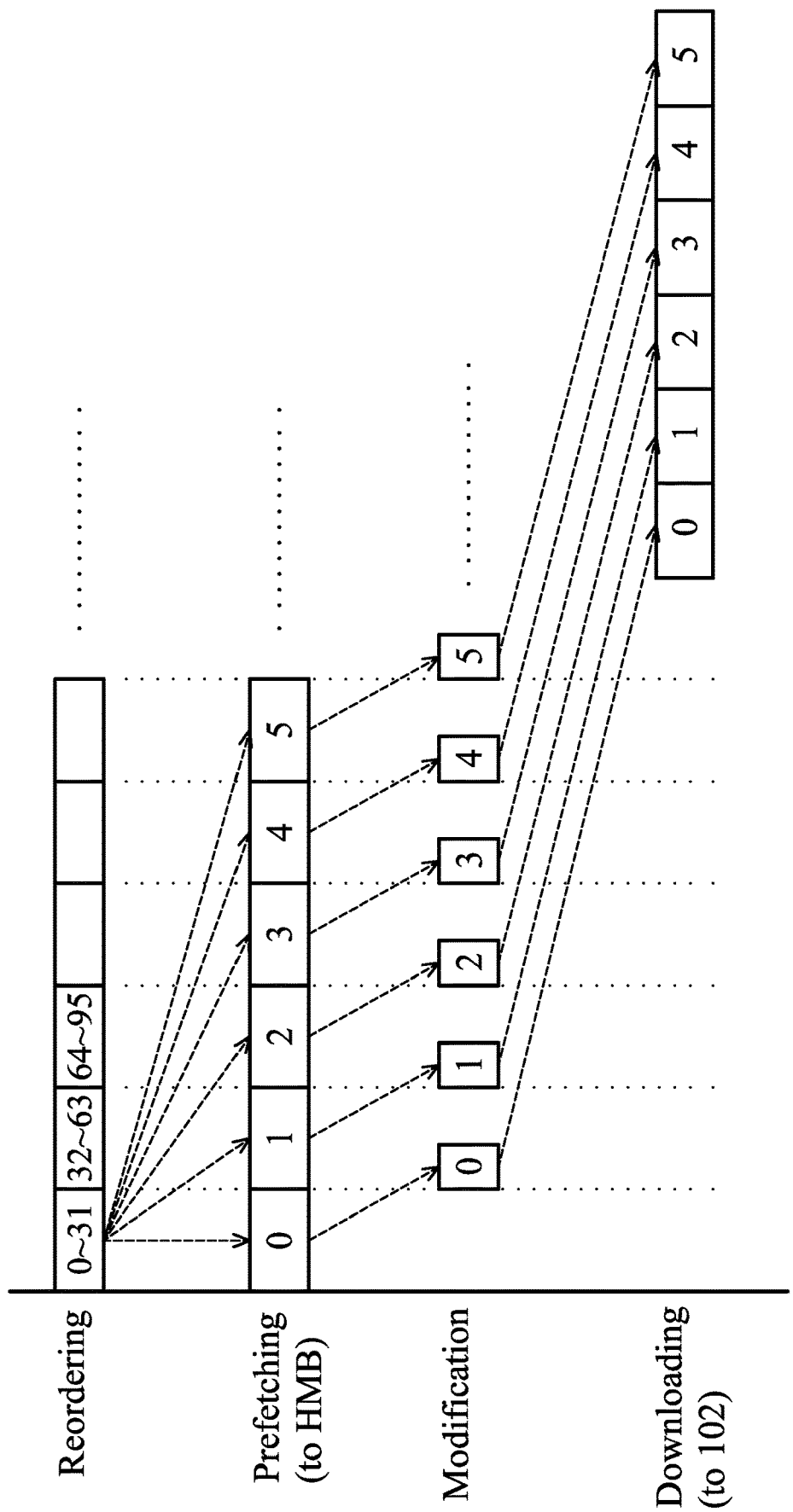
FIG. 4 is a timing diagram depicting an update from a small table F2H to a large table H2F in accordance with an exemplary embodiment of the disclosure.

FIG. 4 is a timing diagram depicting an update from a small table F2H to a large table H2F in accordance with an exemplary embodiment of the disclosure. As shown, each time the reordering hardware scans the buffer Buf3, up to 32 records (numbered from 0 to 31, or 32 to 63, or 64 to 95) of reversed mapping information are obtained without delaying the execution of the other programs. Based on the scanning result of the buffer Buf3, the control unit 104 operates the buffers Buf0 and Buf1 to upload the target logical-to-physical mapping sub-tables H2F_Tabs from the flash memory 102 to the host memory buffer HMB sequentially. In FIG. 4, several logical-to-physical mapping sub-tables H2F_Tabs (indicated by reference numerals 0 to 5 with each numeral corresponding to one logical-to-physical mapping sub-table H2F_Tab) are uploaded to the host memory buffer HMB. For example, the logical-to-physical mapping sub-tables with the different reference numerals may include H2F_Tab#2, #200, #1000. The control unit 104 starts the modification procedure to download a target logical-to-physical mapping sub-table H2F_Tab from the host memory buffer HMB to the buffer Buf2 and update the target logical-to-physical mapping sub-table H2F_Tab on the buffer Buf2 according to the reversed mapping information obtained from the small table F2H. Referring to the reference numeral "0" in FIG. 4, a logical-to-physical mapping sub-table H2F_Tab#2 is modified for an update and then the updated version is stored back in the host memory buffer HMB. Referring to the reference numeral "1" in FIG. 4, a logical-to-physical mapping sub-table H2F_Tab#200 is modified for an update and then the updated version is stored back in the host memory buffer HMB. The modifications on the same logical-to-physical mapping sub-table can be repeated without repeatedly accessing the flash memory 102. The frequency of accessing the flash memory 102 for logical-to-physical mapping sub-tables H2F_Tabs is effectively reduced. According to a data flushing procedure starting prior to a power-off event or a periodically update of mapping information, the update of the large table H2F is completed by downloading the logical-to-physical mapping sub-tables H2F_Tabs from the host memory buffer HMB to the flash memory 102 via the buffers Buf0 and Buf1.

In an exemplary embodiment, the reordering procedure further takes the channel efficiency into account. The communication between the flash memory 102 and the control unit 104 is through multiple channels.

Figure 5A:
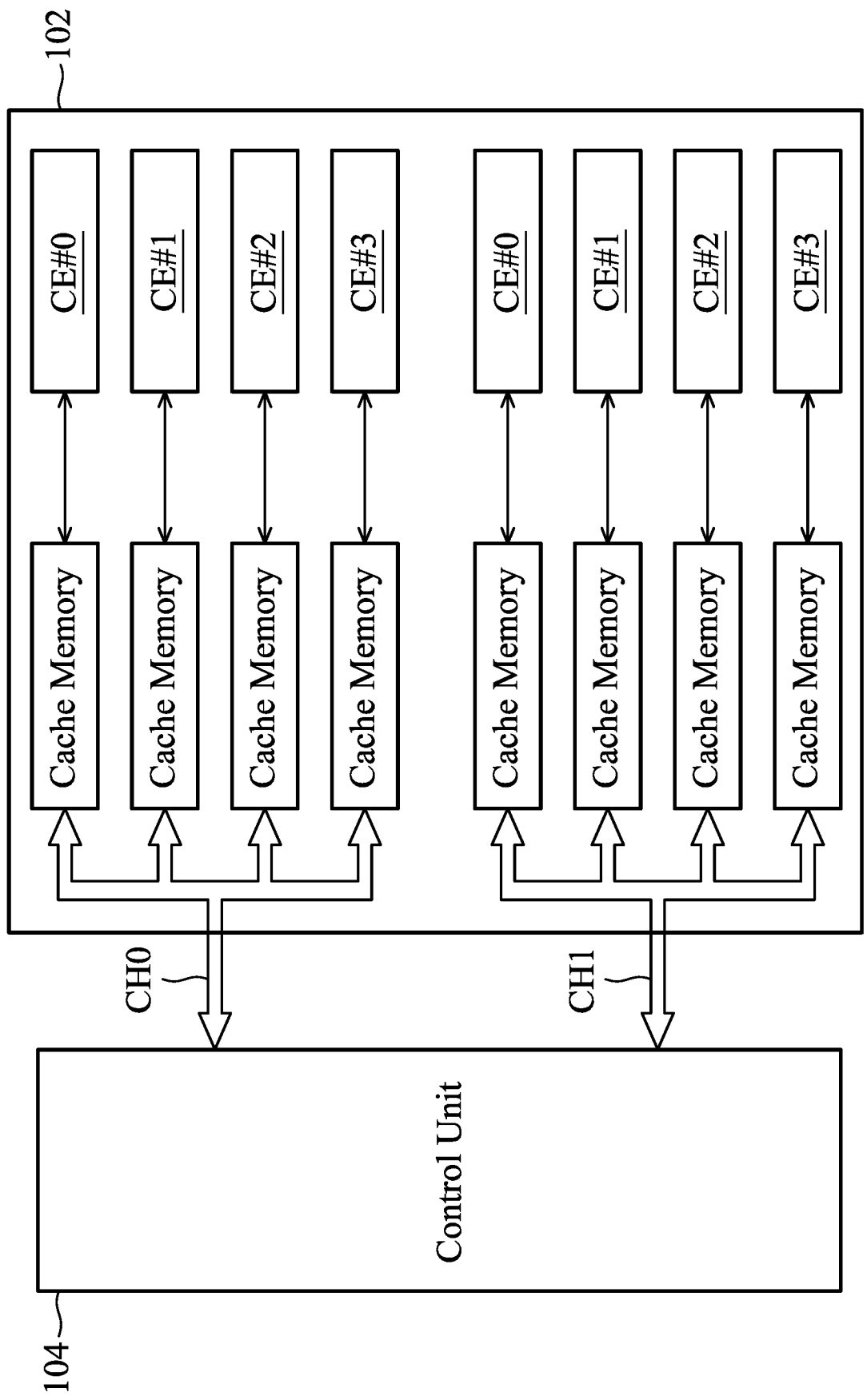
FIG. 5A illustrates a dual channel (including channels CH0 and CH1) architecture for the flash memory 102 in accordance with an exemplary embodiment of the disclosure.
Figure 5B:
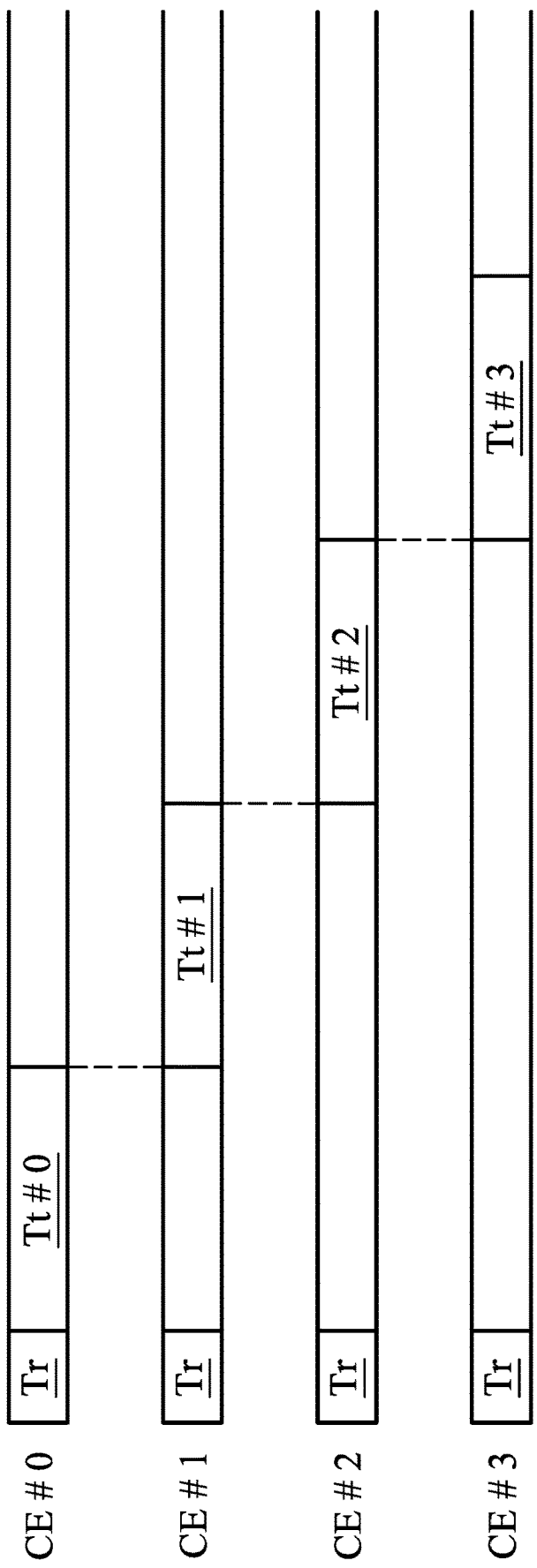
FIG. 5B depicts the access timing of the flash memory 102 that is in the architecture of FIG. 5A.

FIG. 5A illustrates a dual channel (including channels CH0 and CH1) architecture for the flash memory 102 in accordance with an exemplary embodiment of the disclosure. Each channel is shared by four storage spaces. The four storage spaces sharing channel CH0 are CE#0, CE#1, CE#2, and CE#3, labeled by their chip enable signals and each having a corresponding cache memory. Similarly, channel CH1 is shared by another set of four storage spaces CE#0, CE#1, CE#2, and CE#3, labeled by their chip enable signals and each having a corresponding cache memory. The reading of the flash memory 102 involves two phases: a cache phase Tr; and a transfer phase Tt. The user data is first cached (consuming Tr) to a corresponding cache memory, and then transmitted (consuming Tt) to the control unit 104 through a corresponding channel. Regarding the storage spaces sharing the same channel, the cache phases (Tr) may overlap with each other, and the transmission phases (Tt) are scheduled to use the shared channel in an interleaving way. FIG. 5B depicts the access timing of the flash memory 102 that is in the architecture of FIG. 5A. The storage spaces CE#0 . . . CE#3 have overlapped cache phases Tr, and have transmission phases Tt#0 . . . Tt#3 taking place in turn.

According to a reordering procedure of an exemplary embodiment of the present invention, the storage spaces CE#0 . . . CE#3 sharing the same channel are accessed alternately to provide logical-to-physical mapping sub-tables H2F_Tabs in an interleaving way. The same storage space is avoided from being successively accessed. Successively repeating the access on the same storage space (e.g. CE#0 of channel CH0) results in the non-overlapped cache phases Tr, which is quite time consuming. Properly arranging the access on the same storage space is required. Successively accessing the same storage space should be avoided. For example, the access through the channel CH0 should be arranged to access the different storage spaces CE#0 . . . CE#3 in turn. In this manner, the cache phases Tr for the different storage spaces CE#0 . . . CE#3 are arranged in parallel (as shown in FIG. 5B), which is quite time saving.

In an exemplary embodiment, when uploading a logical-to-physical mapping sub-table H2F_Tab#2 fetched from the flash memory 102 and buffered in the buffer Buf0 to the host memory buffer HMB, the controller further uploads another logical-to-physical mapping sub-table H2F_Tab#200 from the flash memory 102 to the buffer Buf1. The logical-to-physical mapping sub-tables H2F_Tab#2 and H2F_Tab#200 are preferably read from the different storage spaces of the flash memory 102 which are controlled by the different chip enable signals (e.g., CE0 and CE1 of channel CH0). This embodiment not only operates the buffers Buf0 and Buf1 in a ping-pong mode but also considers the operational efficiency of the communication channels.

Unlike the ping-pong-mode operated buffers Buf0 and Buf1, another exemplary embodiment of the present invention uses a single buffer to pre-fetch mapping information from the flash memory 102 and to store the updated mapping information back in the flash memory 102.

Any technique that uses the aforementioned host memory buffer HMB (for temporary storage of a large amount of mapping information) is considered within the scope of the present invention. Based on the aforementioned technical content, the present invention further relates to a non-volatile memory operation method.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control unit for a data storage system, comprising:
   a first buffer for dynamic management of a physical-to-logical mapping table F2H, wherein the physical-to-logical mapping table F2H records a mapping relationship which maps a physical address within a target block to a logical address of a sector of user data stored at the physical address, and the control unit performs reverse conversion on the mapping relationship to get reversed mapping information for the logical address and, according to the logical address, the control unit selects a target logical-to-physical mapping sub-table; and
   a second buffer, buffering the target logical-to-physical mapping sub-table when the target logical-to-physical mapping sub-table is read from a host memory buffer HMB, wherein the control unit updates the target logical-to-physical mapping sub-table on the second buffer based on the reversed mapping information about the logical address.

2. The control unit as claimed in claim 1, managing a logical-to-physical mapping table H2F that is formed by a plurality of logical-to-physical mapping sub-tables, wherein the target logical-to-physical mapping sub-table is one of the plurality of logical-to-physical mapping sub-tables.

3. The control unit as claimed in claim 2, which uploads the plurality of logical-to-physical mapping sub-tables to the host memory buffer HMB.

4. The control unit as claimed in claim 2, which uploads some rather than all of the logical-to-physical mapping sub-tables to be buffered in the host memory buffer HMB at the same time.

5. The control unit as claimed in claim 4, wherein the logical-to-physical mapping sub-tables that are uploaded and buffered in the host memory buffer HMB at the same time include the target logical-to-physical mapping sub-table.

6. The control unit as claimed in claim 2, further comprising:
a third buffer,
wherein when the target logical-to-physical mapping sub-table is updated on the second buffer based on the reversed mapping information about the logical address, the control unit uses the third buffer to buffer another logical-to-physical mapping sub-table that is fetched from a non-volatile memory to be uploaded to the host memory buffer HMB.

7. The control unit as claimed in claim 2, further comprising:
a third buffer,
wherein when the target logical-to-physical mapping sub-table is updated on the second buffer based on the reversed mapping information about the logical address, the control unit uses the third buffer to buffer another logical-to-physical mapping sub-table that is downloaded from the host memory buffer HMB to be stored back in a non-volatile memory.

8. The control unit as claimed in claim 1, which stores the target logical-to-physical mapping sub-table that has been updated in the second buffer back in the host memory buffer HMB.

9. The control unit as claimed in claim 1, which downloads the target logical-to-physical mapping sub-table that has been updated and stored back in the host memory buffer HMB to a non-volatile memory.

10. The control unit as claimed in claim 1, wherein:
the target block is an active block or a destination block.

11. A method for updating a logical-to-physical mapping table H2F of a non-volatile memory, comprising:
managing a physical-to-logical mapping table F2H, wherein the physical-to-logical mapping table F2H records a mapping relationship which maps a physical address within a target block to a logical address of a sector of user data stored at the physical address;
performing reverse conversion on the mapping relationship to get reversed mapping information for the logical address, and selecting a target logical-to-physical mapping sub-table according to the logical address; and
fetching the target logical-to-physical mapping sub-table from a host memory buffer HMB, and updating the target logical-to-physical mapping sub-table fetched from the host memory buffer HMB based on the reversed mapping information about the logical address.

12. The method as claimed in claim 11, wherein:
the logical-to-physical mapping table H2F is formed by a plurality of logical-to-physical mapping sub-tables; and
the target logical-to-physical mapping sub-table is one of the plurality of logical-to-physical mapping sub-tables.

13. The method as claimed in claim 12, further comprising:
uploading the plurality of logical-to-physical mapping sub-tables to the host memory buffer HMB.

14. The method as claimed in claim 12, further comprising:
uploading some rather than all of the logical-to-physical mapping sub-tables to be buffered in the host memory buffer HMB at the same time.

15. The method as claimed in claim 14, wherein:
the logical-to-physical mapping sub-tables that are uploaded and buffered in the host memory buffer HMB at the same time include the target logical-to-physical mapping sub-table.

16. The method as claimed in claim 12, wherein:
when the target logical-to-physical mapping sub-table is updated based on the reversed mapping information about the logical address, another logical-to-physical mapping sub-table is fetched from the non-volatile memory and uploaded to the host memory buffer HMB.

17. The method as claimed in claim 12, wherein:
when the target logical-to-physical mapping sub-table is updated based on the reversed mapping information about the logical address, another logical-to-physical mapping sub-table is downloaded from the host memory buffer HMB and stored back in the non-volatile memory.

18. The method as claimed in claim 11, further comprising:
storing the target logical-to-physical mapping sub-table that has been updated back in the host memory buffer HMB.

19. The method as claimed in claim 18, further comprising:
downloading the target logical-to-physical mapping sub-table that has been updated and stored back in the host memory buffer HMB to the non-volatile memory.

20. The method as claimed in claim 11, wherein:
the target block is an active block or a destination block.

* * * * *